United States Patent
Dangl et al.

(10) Patent No.: US 6,863,334 B2
(45) Date of Patent: Mar. 8, 2005

(54) SYSTEM FOR OPENING AND CLOSING A FOLDING TOP OR DISPLACEABLE VEHICLE ROOF ON A CONVERTIBLE VEHICLE

(75) Inventors: Wolfgang Dangl, Mainburg (DE); Reinhold Kluge, Hallbergmoos (DE); Klaus Stolle, Altenstadt (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 10/724,203

(22) Filed: Dec. 1, 2003

(65) Prior Publication Data

US 2004/0155481 A1 Aug. 12, 2004

Related U.S. Application Data

(63) Continuation of application No. PCT/EP02/04868, filed on May 3, 2002.

(30) Foreign Application Priority Data

Jun. 1, 2001 (DE) ........................................ 101 26 672
Jan. 18, 2002 (DE) ........................................ 102 01 871

(51) Int. Cl.[7] ................................................ B60J 7/08
(52) U.S. Cl. ................. 296/107.09; 296/115; 296/117; 296/107.01
(58) Field of Search ........................ 296/100.1, 107.01, 296/117, 115, 107.09

(56) References Cited

U.S. PATENT DOCUMENTS 5,225,747 A    7/1993  Helms et al.
6,246,199 B1 *  6/2001  Porter et al. ................. 296/115
2001/0010430 A1 *  8/2001  Mentink ....................... 296/117

FOREIGN PATENT DOCUMENTS

| DE | 3424461 | 1/1985 |
|---|---|---|
| DE | 9412435.3 | 11/1994 |
| DE | 19701927 | 6/1998 |
| DE | 19845008 | 5/1999 |
| DE | 19752535 | 6/1999 |
| DE | 10051639 | 6/2001 |
| EP | 0550952 | 7/1993 |
| EP | WO-01/32452 A2 * | 5/2001 |
| EP | 001128074 A2 * | 8/2001 |
| EP | 001217221 A2 * | 6/2002 |

OTHER PUBLICATIONS

"Position Tranducers Provide System Feedback", Technology Review, Hydraulics & Pneumatics, Apr. 2000, XP-000937261.

* cited by examiner

*Primary Examiner*—Jason Morrow
(74) *Attorney, Agent, or Firm*—Crowell & Moring LLP

(57) ABSTRACT

A system for opening and closing a folding top or moveable vehicle roof of a convertible car is provided, with at least one drive to operate the top or roof, at least one linear position sensor that senses continuously the position of an element of the top or roof and, a controller that receives a signal from the at least one position sensor and generates, a signal to actuate at least one drive. The linear sensor is arranged to determine the position of any element of the folding top or moveable vehicle roof relative to another moveable element of the top or roof or to a fixed element relative to the vehicle.

37 Claims, 3 Drawing Sheets

SYSTEM FOR OPENING AND CLOSING A FOLDING TOP OR DISPLACEABLE VEHICLE ROOF ON A CONVERTIBLE VEHICLE

The present application is a continuation of International Patent Application No. PCT/EP02/04868, filed May 3, 2002, designating the United States of America and published in German as WO 02/098692 A1. Priority is claimed based on Federal Republic of Germany patent document DE 101 26 672.3 filed Jun. 1, 2001 and Federal Republic of Germany patent document DE 102 01 871.5 filed Jan. 18, 2002.

BACKGROUND AND SUMMARY OF THE INVENTION

The invention relates to a system for opening and closing a folding top or moveable vehicle roof of a convertible car.

A system of this class is disclosed in the U.S. Pat. No. 5,225,747. In this system an arrangement of sensors is chosen for a convertible top. With this system the opening and/or closing motion of the convertible top can be sensed over at least one defined range of movement. The system comprises drive means, which are connected to parts, for example, linkage elements, for opening and closing the convertible top. In addition, there are position sensors in the form of pivot point sensor that are arranged in the hinge area of the linkage. These pivot point sensor sense the movement of the convertible top at least over one range of movement and send a corresponding signal to a controller, which defines and controls the further actuation of the convertible top based on the input signals.

Proceeding from this state of the art, the object of the present invention is to improve such a system that the position sensors can be arranged at positions near the drive.

This problem is solved by the arrangement of at least one position sensor is designed as a linear sensor in such a manner that the position of two moveable elements of the folding top or moveable vehicle roof relative to each other can be sensed; or the position of one moveable element of the folding top or moveable vehicle roof relative to a fixed reference point of the vehicle can be sensed. This design of the position sensor makes it possible to arrange it not only in the area of a hinge of one element of the folding top or moveable vehicle roof, but especially in the vicinity of a drive.

According to a special embodiment, the position sensor can be coupled with drive means, and in particular can be integrated into it. This embodiment has turned out to be especially advantageous when the drive means also perform a linear movement when opening or closing the folding top or moveable vehicle roof, for example, when the drive means comprise a piston-cylinder arrangement (e.g. hydraulic cylinder), which moves back and forth when actuating the folding top or moveable vehicle roof.

The elements of the folding top or moveable vehicle roof that are to be sensed in a special manner are its main pillar and hold down clamp. For this reason in a preferred embodiment of the invention the sensor is arranged in such a manner that the position of the main pillar or a hold down clamp of the folding top or moveable vehicle roof to a fixed reference point of the vehicle or to another reference point of the folding top or moveable vehicle roof can be found.

Of course, in addition to a linear sensor, still other sensors, like the pivot point sensors or end position switches that are described in the U.S. Pat. No. 5,225,747, can be used. However, what is relevant for the present invention is that at least one linear sensor is used.

The linear sensor can be designed as a magnetoresistive sensor, and in particular comprise a magnetized ferrite rod, where the ferrite rod can be magnetized spirally and, as the ferrite rod moves, it is guided past a magnetic field sensor. In addition, the linear sensor can work according to the principle of variable inductivity, where, for example, a ring can be arranged on a rod so that, as the rod moves, the ring is guided past a coil. In this manner the position of the rod can also be found in a simple and inexpensive manner. As an alternative, a conductive piston inside a coil could trigger such feedback on the coil that the position of the piston can be inferred from the changing signal voltage.

Other objects, advantages and novel features of the present invention will become apparent from the following detailed description of the invention when considered in conjunction with the accompanying drawings.

DETAILED DESCRIPTION

The linear sensors themselves shall not be discussed in the course of the description to follow. For information on the linear sensors reference is made to the publications of Hoerbiger Hydraulik GmbH on magnetoresistive linear sensors and the embodiments of the company Micro-Epsilon for linear sensors that work on the principle of variable inductivity.

Figure 1:
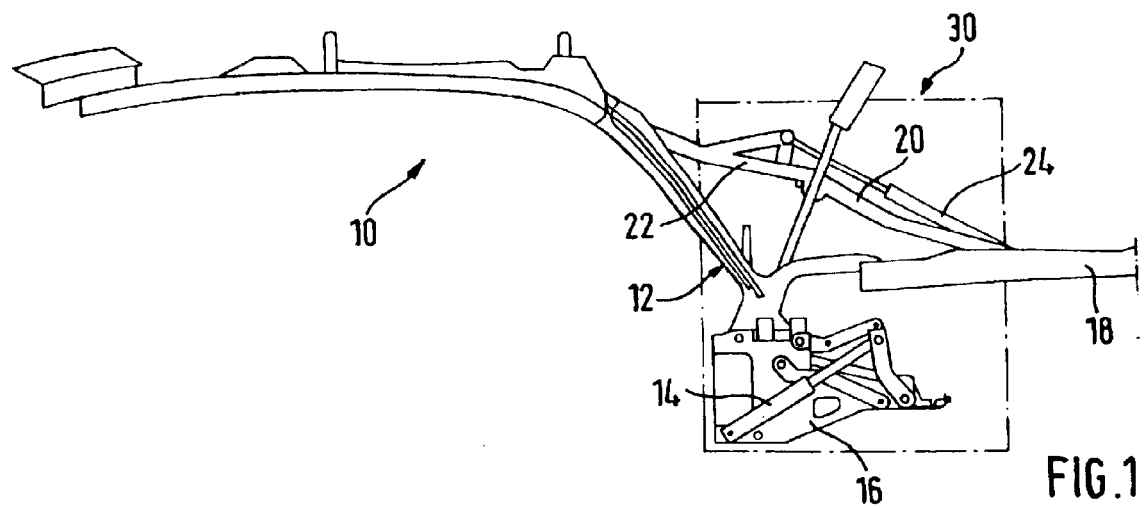
FIG. 1 is a schematic drawing of one part of a linkage of a folding top.

The present invention is used in a folding top of a convertible car, where FIG. 1 shows a part of the linkage of the folding top. Not shown were the vehicle as well as those parts of the folding top that are not essential for the invention, like the material of the cover top.

In a convertible car the folding top can be moved customarily into a folding top compartment below a folding top cover. To open a closed convertible folding top, the folding top must first be unlatched in its head region. Such a procedure and/or such a device are/is known, for example, from the U.S. Pat. No. 5,058,939. Then conventionally a hold down clamp is lifted so that the folding top cover can be opened. To move the folding top freely, the windows of the vehicle are lowered at least slightly. After the folding top cover has been opened completely, the hold down clamp swings back and the folding top begins to drop into the folding top compartment. For this purpose the linkage in the main part of the folding top folds at several hinge points so that on the whole a folding occurs in order to deposit the folding top completely into the folding top compartment. Once the folding top has been put totally into the folding top compartment, the folding top cover is closed.

To close the folding top, the sequence of action described above is reversed.

As already disclosed in the U.S. Pat. No. 5,225,747, for a flawless opening and closing process, the position of the individual linkage parts must be known, if possible, at every movement step. In particular, it is important to know the positions of the hold down clamp and the main pillar. For this purpose linear sensors are used in accordance with the present invention.

In the embodiment in FIG. 1, in which only the relevant parts of the linkage are shown schematically, a main pillar 12 of a linkage unit 10 of a folding top is actuated by a first hydraulic cylinder 14 so that after every operation of the hydraulic cylinder 14 it can be pivoted in a main position. In addition, hold down clamps are actuated by means of a second hydraulic cylinder 24. The one end of the second hydraulic cylinder 24 is connected to an upper tensioning rod 22, which in turn produces a connection between other parts 12 of the linkage and a bottom tensioning rod 20. The bottom tensioning rod 20 is connected in turn to a hold down clamp 18. The other end of the second hydraulic cylinder 24 is braced directly against the hold down clamp 18.

To perform the aforementioned procedure in opening and closing the folding top, the two hydraulic cylinders 14 and 24 are actuated in an exactly predefined manner. To lift the hold down clamp 18, the first hydraulic cylinder 24 is shortened by its own actuation. After unlatching the folding top at its front end and opening the folding top cover, the hold down clamp 18 can be lowered in the direction of the open folding top compartment by repeatedly extending the hydraulic cylinder 24; as the hydraulic cylinders 14 and 24 continue to operate, the folding top is folded, as the top continues to move back, into the folding top compartment and finally can be moved totally into the folding top compartment.

Figure 2:
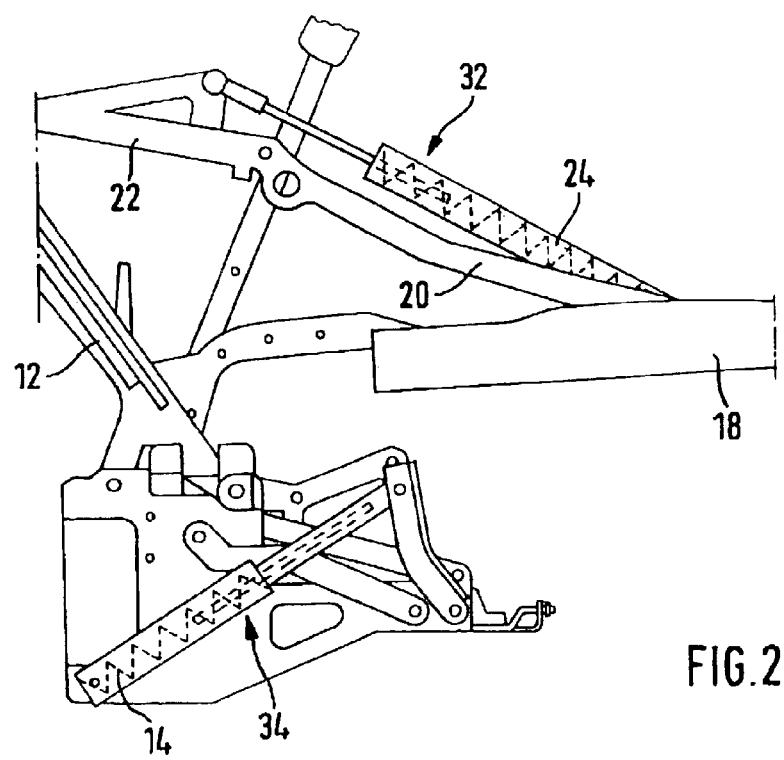
FIG. 2 is a detail view of FIG. 1 with a first embodiment of the invention in the form of linear sensors in accordance with the present invention.

To detect now a malfunction during the opening and closing process, the two hydraulic cylinders 14 and 24 are integrated, according to FIG. 2, into a linear sensor. In the case under discussion the linear sensors 32 and 34 are shown only as a schematic drawing; and in particular through the suggestion of a coil (zig-zag line) and a thick line, which is supposed to symbolize a magnetized rod. As the respective hydraulic cylinders 14 and 24 move, the rod is displaced in the coil. By this displacement of the magnetized ferrite rod inside the coil the length of each hydraulic cylinder can be determined. Altogether the exact distance between the two articulated points of the hydraulic cylinder can be found; and thus the position of the individual folding top elements relative to each other are determined. With respect to the hydraulic cylinder 24, it is thus possible to find the position of the hold down clamp 18 in relation to the upper tensioning rod. With respect to the hydraulic cylinder 14 it is possible to determine the position of the main pillar with respect to an element, mounted rigidly on the vehicle.

The two linear sensors send a corresponding signal to a control, which is not shown in the present case. On the basis of various signal information and the operating situation of the folding top, this control closes in response to a malfunction or confirms a proper functioning mode. Should a malfunction be determined, the flow of movement can be stopped and the driver can be informed; or the controller can correct the flow.

Through the use of a linear sensor, the sensor can be coupled advantageously to the drive system. In this case the fact that the cable guide by the sensors arranged in the drive area can be designed more easily than in other parts of the folding top has a beneficial effect.

Figure 3:
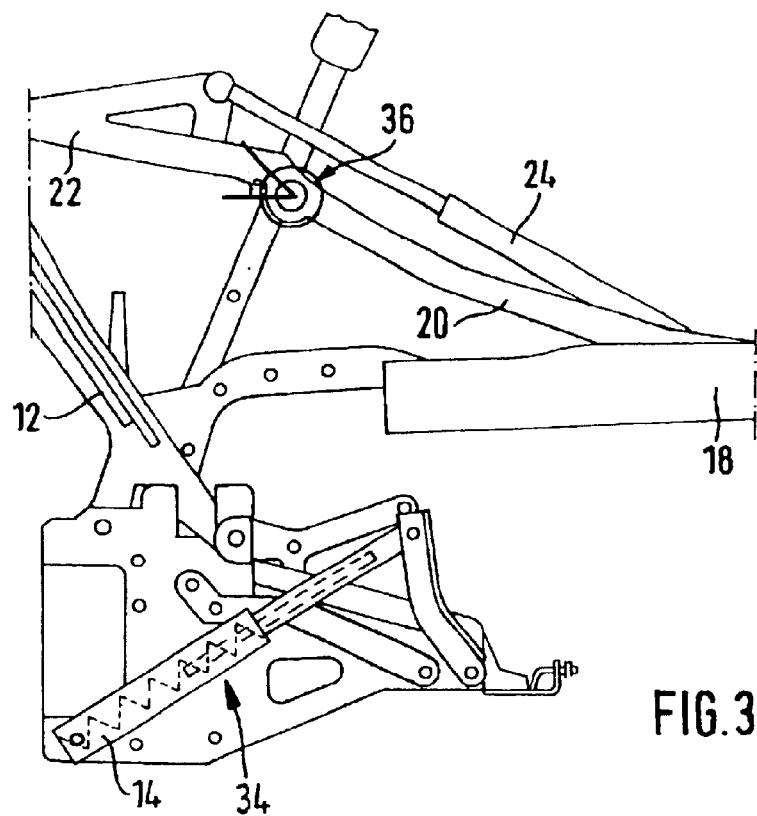
FIG. 3 is a detail view of FIG. 1 with an alternative embodiment of position sensors in accordance with the present invention.

The embodiment, according to FIG. 3, differs from that in FIG. 2 only in that now the linear sensor 32 is replaced by a pivot point sensor 36 in the hinge area between the top and the bottom tensioning rod.

Figure 4:
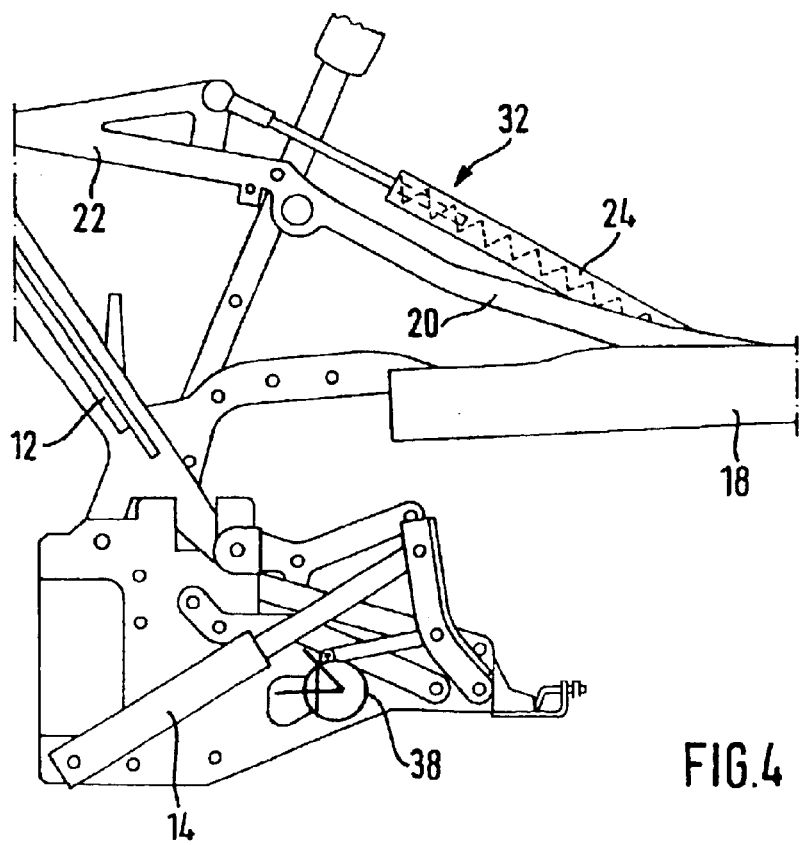
FIG. 4 is a detail view of FIG. 1, with a third embodiment of position sensors in accordance with the present invention.

In FIG. 4, at variance with the embodiment in FIG. 2, the linear sensor 34 was replaced by a pivot point sensor 38.

Figure 5:
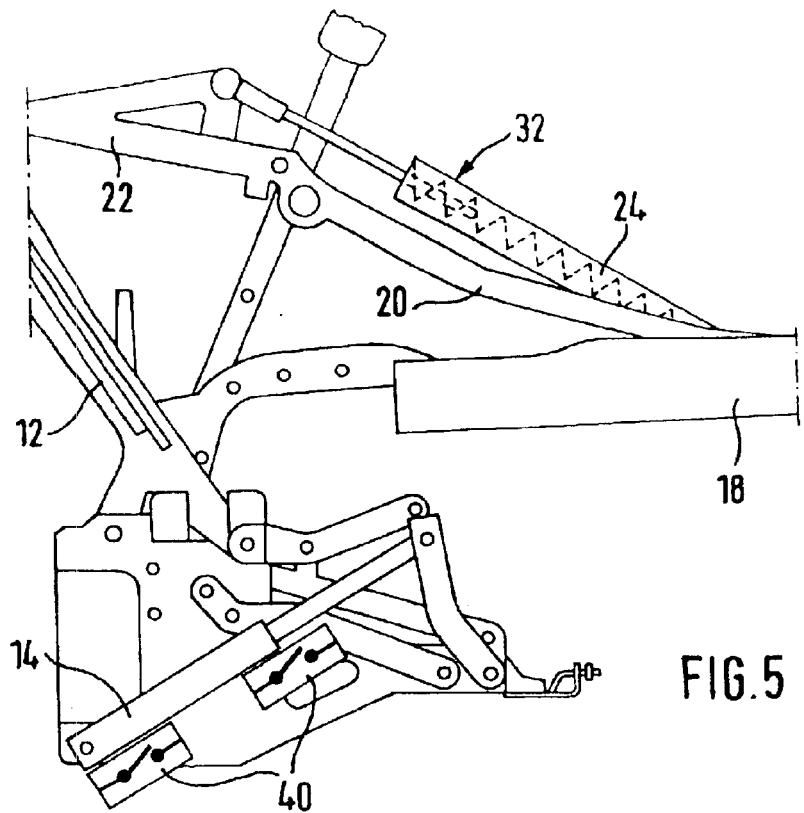
FIG. 5 is a detail view of FIG. 1, with a fourth embodiment of position sensors in accordance with the present invention.

In FIG. 5, the linear sensor 34 in FIG. 2 was replaced by two end position switches 40, which are closed when the hydraulic cylinder is in its totally extended or totally retracted position. In all cases, in which a linear sensor was replaced by a pivot point sensor or a switch, the corresponding signal line is run analogously to a controller and evaluated.

Figure 6:
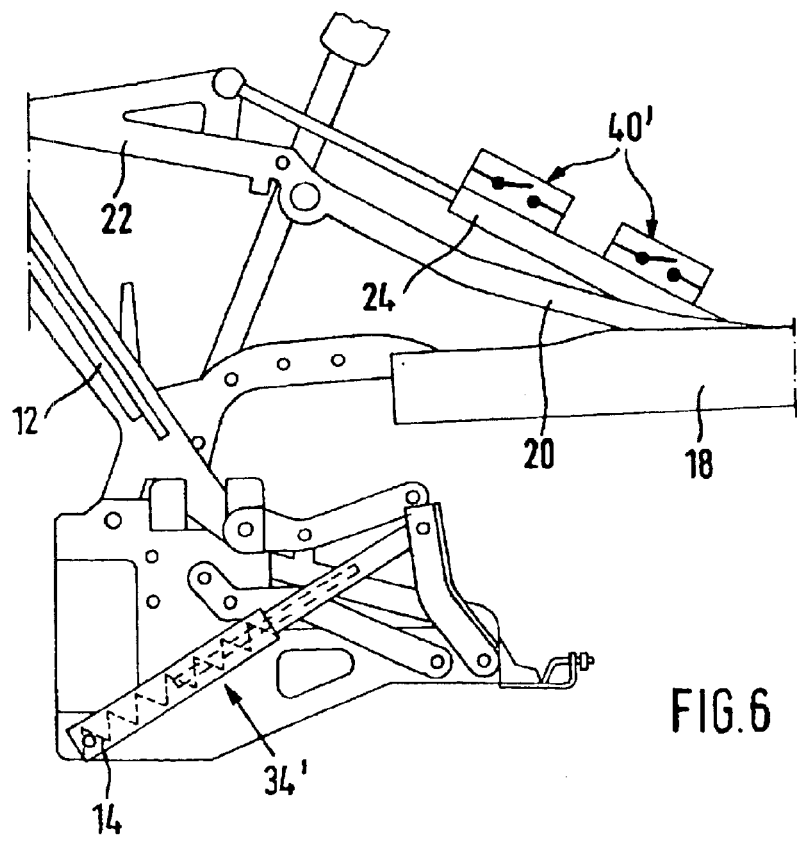
FIG. 6 is a detail view of FIG. 1, with a fifth embodiment of the position sensors in accordance with the present invention.

FIG. 6 shows an embodiment, in which, compared to the embodiment in FIG. 5, the two end position switches 40', on the one hand, and the linear sensor 34', on the other hand, have been basically exchanged.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. System for opening and closing a moveable roof of a convertible vehicle, comprising:

at least one drive means to open and close the moveable vehicle roof;

at least one position sensor that senses continuously a position of an element of the moveable vehicle roof at least over a subrange of a path of movement; and a controller that receives a signal from at least one position sensor and generates, in consideration of the at least one position sensor signal, a signal to actuate the at least one drive means;

wherein the at least one position sensor is a linear sensor arranged to sense at least one of the position of two moveable elements of the moveable vehicle roof relative to each other, and the position of one moveable element of the moveable vehicle roof relative to a fixed reference point of the vehicle.

2. System, as claimed in claim 1, wherein the moveable vehicle roof is a folding top.

3. System, as claimed in claim 2, wherein the at least one position sensor is coupled and integrated with the at least one drive means.

4. System, as claimed in claim 2, wherein the at least one drive means includes a piston.

5. System, as claimed in claim 4, wherein the drive means is operated hydraulically or pneumatically.

6. System, as claimed in claim 3, wherein the at least one drive means includes a piston.

7. System, as claimed in claim 6, wherein the drive means is operated hydraulically or pneumatically.

8. System, as claimed in claim 2, wherein an electric motor is provided as the drive means.

9. System, as claimed in claim 3, wherein an electric motor is provided as the drive means.

10. System, as claimed in claim 2, wherein the linear sensor is arranged to permit determination of the relative position of the position of a main pillar of the moveable vehicle roof to a fixed reference point of the vehicle.

11. System, as claimed in claim 3, wherein the linear sensor is arranged to permit determination of the relative position of the position of a main pillar of the moveable vehicle roof to a fixed reference point of the vehicle.

12. System, as claimed in claim 2, wherein the linear sensor is arranged to permit determination of the position of a hold down clamp of the moveable vehicle roof to another reference point of the moveable vehicle roof.

13. System, as claimed in claim 3, wherein the linear sensor is arranged to permit determination of the position of a hold down clamp of the moveable vehicle roof to another reference point of the moveable vehicle roof.

14. System, as claimed in claim 2, further comprising:

a pivot point sensor, wherein the pivot point sensor determines, at least over a part of the range of movement, one of the relative position of two moveable elements of the moveable vehicle roof relative to each other and the absolute position of one moveable element of the moveable vehicle roof to a fixed element of the vehicle, and sends a signal corresponding to the determined position to the controller.

15. System, as claimed in claim 3, further comprising:

a pivot point sensor, wherein the pivot point sensor determines, at least over a part of the range of movement, one of the relative position of two moveable elements of the moveable vehicle roof relative to each other and the absolute position of one moveable element of the moveable vehicle roof to a fixed element of the vehicle, and sends a signal corresponding to the determined position to the controller.

16. System, as claimed in claim 2, further comprising:

at least one switch that sends a signal to the controller when an element of the moveable vehicle roof has reached a specific position.

17. System, as claimed in claim 3, further comprising:

at least one switch that sends a signal to the controller when an element of the moveable vehicle roof has reached a specific position.

18. System, as claimed in claim 2, wherein the linear sensor is a magnetoresistive sensor.

19. System, as claimed in claim 18, wherein the magnetoresistive sensor comprises a magnetized ferrite rod that is guided past a magnetic field sensor.

20. System, as claimed in claim 3, wherein the linear sensor is a magnetoresistive sensor.

21. System, as claimed in claim 20, wherein the magnetoresistive sensor comprises a magnetized ferrite rod that is guided past a magnetic field sensor.

22. System, as claimed in claim 2, wherein the linear sensor works according to the principle of variable inductivity.

23. System, as claimed in claim 22, wherein the linear sensor comprises a ring is adapted be guided past an induction coil parallel to the axis of a coil.

24. System, as claimed in claim 23, wherein the ring is made of aluminum or copper.

25. System, as claimed in claim 24, wherein a conductive piston is guided through the coil.

26. System, as claimed in claim 3, wherein the linear sensor works according to the principle of variable inductivity.

27. System, as claimed in claim 26, wherein the linear sensor comprises a ring adapted to be guided past an induction coil parallel to the axis of a coil.

28. System, as claimed in claim 27, wherein the ring is made of aluminum or copper.

29. System, as claimed in claim 28, wherein a conductive piston is guided through the coil.

30. A method for opening and closing a moveable roof of a convertible vehicle, comprising the acts of:

actuating at least one drive means to initiate movement of the movable roof;

determining continuously a position of an element of the moveable vehicle roof at least over a subrange of a path of movement with at least one position sensor; and, controlling movement of the moveable vehicle roof with a controller, wherein the controller receives a signal from the at least one position sensor and controls the at least one drive means in response to the at least one position sensor signal, and wherein the at least one position sensor is a linear sensor arranged to sense at least one of the position of two moveable elements of the moveable vehicle roof relative to each other, and the position of one moveable element of the moveable vehicle roof relative to a fixed reference point of the vehicle.

31. The method of claim 30, wherein the moveable vehicle roof is a folding top roof.

32. The method of claim 31, wherein the linear sensor determines the relative position of the position of a main pillar of the moveable vehicle roof to a fixed reference point of the vehicle.

33. The method of claim 31, wherein the linear sensor determines the position of a hold down clamp of the moveable vehicle roof to another reference point of the moveable vehicle roof.

34. The method of claim 31, further comprising the act of:

determining with a pivot point sensor, at least over a part of the range of movement, one of the relative position of two moveable elements of the moveable vehicle roof relative to each other and the absolute position of one moveable element of the moveable vehicle roof to a fixed element of the vehicle, wherein the controller receives a signal from the pivot point sensor and controls the at least one drive means in response to at least one of the at least one position sensor signal and the pivot point sensor signal.

35. The method of claim 31, further comprising the act of:

determining when an element of the moveable vehicle roof has reached a specific position with at least one switch, wherein the controller receives a signal from the at least one switch and controls the at least one drive means in response to at least one of the at least one position sensor signal and the at least one switch signal.

36. The method of claim 31,
    wherein the linear sensor is a magnetoresistive sensor.

37. A sensing and actuating apparatus for use in opening and closing a moveable roof of a convertible vehicle, comprising:
    at least one drive means adapted to open and close the moveable vehicle roof; and
    at least one position sensor that senses continuously a position of an element of the moveable vehicle roof at least over a subrange of a path of movement,
    wherein the at least one position sensor is a linear sensor arranged to sense at least one of the position of two moveable elements of the moveable vehicle roof relative to each other, and the position of one moveable element of the moveable vehicle roof relative to a fixed reference point of the vehicle, and
    wherein the at least one position sensor is coupled and integrated with at least one drive means.

* * * * *